United States Patent
Jobashi (10) Patent No.: US 10,963,344 B2
(45) Date of Patent: Mar. 30, 2021

(54) INFORMATION PROCESSING CIRCUITRY, INFORMATION PROCESSING METHOD, AND NON-TRANSITORY COMPUTER READABLE MEDIUM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masashi Jobashi, Taito Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/815,091

(22) Filed: Mar. 11, 2020

(65) Prior Publication Data
US 2020/0379846 A1    Dec. 3, 2020

(30) Foreign Application Priority Data
May 28, 2019 (JP) .............................. JP2019-099616

(51) Int. Cl.
*G06F 11/10*    (2006.01)
(52) U.S. Cl.
CPC ............................... *G06F 11/1076* (2013.01)
(58) Field of Classification Search
CPC .................................................. G06F 11/1076
See application file for complete search history.

(56) References Cited

U.S. PATENT DOCUMENTS

| | | | | |
|---|---|---|---|---|
| 5,270,979 A * | 12/1993 | Harari | ................. | G11C 16/26 365/185.09 |
| 5,396,468 A * | 3/1995 | Harari | ................. | G11C 16/10 365/185.01 |
| 5,504,760 A * | 4/1996 | Harari | ................. | G11C 16/10 365/190 |

(Continued)

FOREIGN PATENT DOCUMENTS

| JP | H04322340 A | 11/1992 |
|---|---|---|
| JP | 2701703 B2 | 9/1993 |

(Continued)

*Primary Examiner* — Kyle Vallecillo
(74) *Attorney, Agent, or Firm* — Holtz, Holtz & Volek PC (57) ABSTRACT

An information processing circuitry includes a storage data generation circuitry, a storage circuitry, a comparison data generation circuitry, and a data comparison circuitry. The storage data generation circuitry is configured to add redundancy bits and a write flag indicating that writing has been made, to input data to generate storage data. The storage circuitry is configured to store the storage data. The comparison data generation circuitry is configured to generate redundancy bits from data stored in the storage circuitry and address accessing to the storage circuitry. The data comparison circuitry is configured to compare the redundancy bits added by the storage data generation circuitry with the redundancy bits generated by the comparison data generation circuitry to execute error detection based on a comparison result and on the write flag.

18 Claims, 5 Drawing Sheets

(56) References Cited

U.S. PATENT DOCUMENTS

| | | | | |
|---|---|---|---|---|
| 5,629,950 | A | * | 5/1997 | Godiwala ........... G06F 11/1064 711/131 |
| 6,292,906 | B1 | * | 9/2001 | Fu ....................... G06F 12/0831 711/146 |
| 2005/0071722 | A1 | * | 3/2005 | Biles .................... G06F 11/004 714/746 |
| 2007/0113158 | A1 | * | 5/2007 | Fischer ................. G11C 15/00 714/777 |
| 2009/0237979 | A1 | * | 9/2009 | Mukai ..................... G11C 8/08 365/148 |

FOREIGN PATENT DOCUMENTS

| | | |
|---|---|---|
| JP | H07073106 A | 3/1995 |
| JP | H08022419 A | 1/1996 |
| JP | 4025575 B2 | 10/2007 |

* cited by examiner

INFORMATION PROCESSING CIRCUITRY, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2019-099616, filed on May 28 2019, the entire contents of which are incorporated herein by reference.

FIELD

The embodiments of the present invention relate to an information processing circuitry, an information processing method, and a non-transitory computer readable medium.

BACKGROUND

In an information processing device, coping with a fault inside the device is widely required. For example, in an on-vehicle data processing device, it is required to mount a function capable of detecting a fault inside the device and a fault diagnosis function of a circuitry which detects a fault in order to conform to ISO26262. In the memory data, the values parity, ECC and the like calculated from data at the writing and at the reading are compared to detect the fault. On the other hand, a fault of a fault detection circuitry itself is detected by duplexing of memory, LBIST (Logic Built-in Self-Test). In this case, inside a memory macro, there are many package products and an arbitrary fault detection circuitry cannot be inserted. Therefore, it is necessary to divide the memory into two parts in order to have the redundancy of an address decoder and other control circuitry of memory module, which causes the problem of increase in area of circuitry and power consumption.

DETAILED DESCRIPTION

According to one embodiment, an information processing circuitry includes a storage data generation circuitry, a storage circuitry, a comparison data generation circuitry, and a data comparison circuitry. The storage data generation circuitry configured to add redundancy bits and a write flag indicating that writing has been made, to input data to generate storage data. The storage circuitry configured to store the storage data. The comparison data generation circuitry configured to generate redundancy bits from data stored in the storage circuitry. The data comparison circuitry configured to compare the redundancy bits added by the storage data generation circuitry with the redundancy bits generated by the comparison data generation circuitry to execute error detection based on a comparison result and on the write flag.

Hereinafter, embodiments are explained referring to the drawings. Note that the drawings and the explanation described in this specification are presented as examples but do not limit the present invention. Further, duplicated explanation of components is omitted in some cases.

Figure 1:
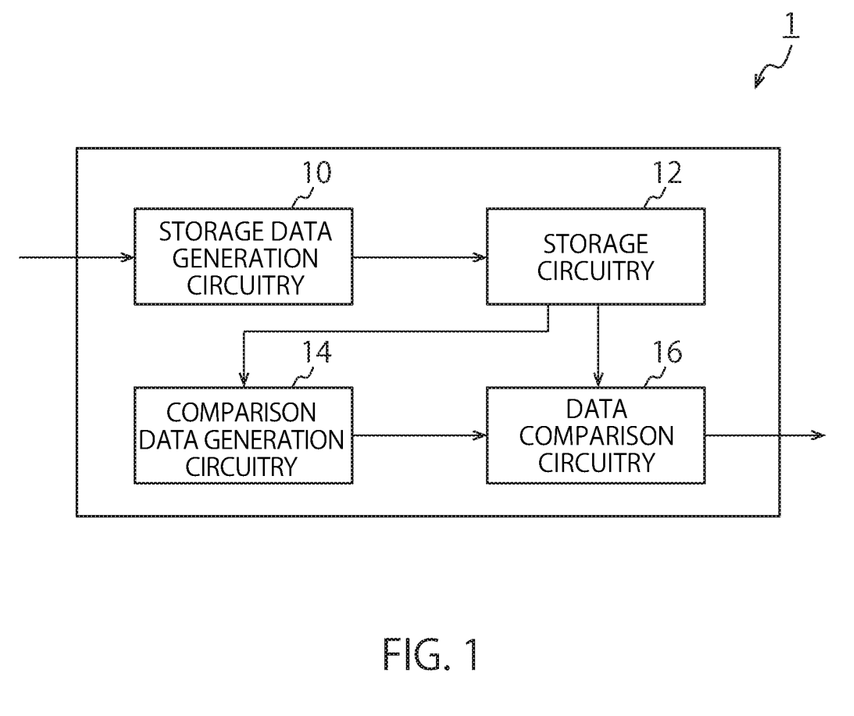
FIG. 1 is a block diagram illustrating functions of an information processing circuitry according to an embodiment.

FIG. 1 is a block diagram illustrating functions of an information processing circuitry 1 according to this embodiment. The information processing circuitry 1 includes a storage data generation circuitry 10, a storage circuitry 12, a comparison data generation circuitry 14, and a data comparison circuitry 16. The information processing circuitry 1 is a circuitry which writes data into the storage circuitry 12 or reads data from the storage circuitry 12.

The storage data generation circuitry 10 adds redundancy bits based on data input into the information processing circuitry 1 to generate data to be stored in the storage circuitry 12. The redundancy bits are, for example, bits including information on parity or ECC (Error Correction Code) with respect to data, parity with respect to an address at which data is to be stored and the like. The redundancy bits may change in bit length depending on their contents. For example, in the case of the parity, the redundancy bits may be 1 bit, or in the case of the ECC, the number of bits may change depending on the level of error detection or error correction.

Besides, as the redundancy bits, a write flag indicating that writing has been made is included. The write flag may be 1 bit or 2 bits or more. As the write flag, for example, 0 is set in the initial state and 1 is set at the writing. In the case where the write flag is 2 bits or more, the bits may be provided as adjacent bits in a write region. More preferably, the bits may be provided as bits existing at positions away from each other in the write region. The write flag may be provided 1 bit each before and after the data region to hold the data region therebetween, or may be provided 1 bit each before and after the redundancy bits such as parity, ECC and the like. Setting the write flag to 2 bits or more makes it possible to further enhance the reliability of the stored data.

The storage circuitry 12 stores the data generated by the storage data generation circuitry 10. The storage circuitry 12 includes transitory or non-transitory storage means, for example, various kinds of RAMs (Random Access Memories). This storage circuitry 12 stores the data at the address designated for the data.

The comparison data generation circuitry 14 generates bits corresponding to redundancy bits from data stored in the storage circuitry 12. More specifically, the comparison data generation circuitry 14 generates redundancy bits using the same method as that of the storage data generation circuitry 10, from the input data excluding the address information and the redundancy bits in the data stored in the storage circuitry 12.

The data comparison circuitry 16 compares the redundancy bits stored in the storage circuitry 12 with the redundancy bits generated by the comparison data generation circuitry 14 to detect whether or not there occurs an error in the data stored in the storage circuitry 12. Further, the data comparison circuitry 16 confirms whether all of the write flags are 1.

In the case where all of the write flags are 1 and there are different redundancy bits, it is determined that there is an error, and the fact that there is an error is output. In the case where all of the write flags are not 0 or all of the redundancy bits coincide, it is determined that there is no error, and the fact that there is no error is output as error information.

As explained above, the information processing circuitry 1 determines whether data is correctly stored in the storage circuitry 12 and correctly read out, and outputs its result. The fault of the storage circuitry 12 can be detected without dividing the memory area provided in the storage circuitry 12. Avoiding the division of the memory area can suppress the power consumption. Further, the circuitry provided as a fault detection circuitry is composed of a generation circuitry and a comparison circuitry for redundancy bits, so that the installation area of the circuitry can be suppressed.

First Mounting Example

Figure 2:
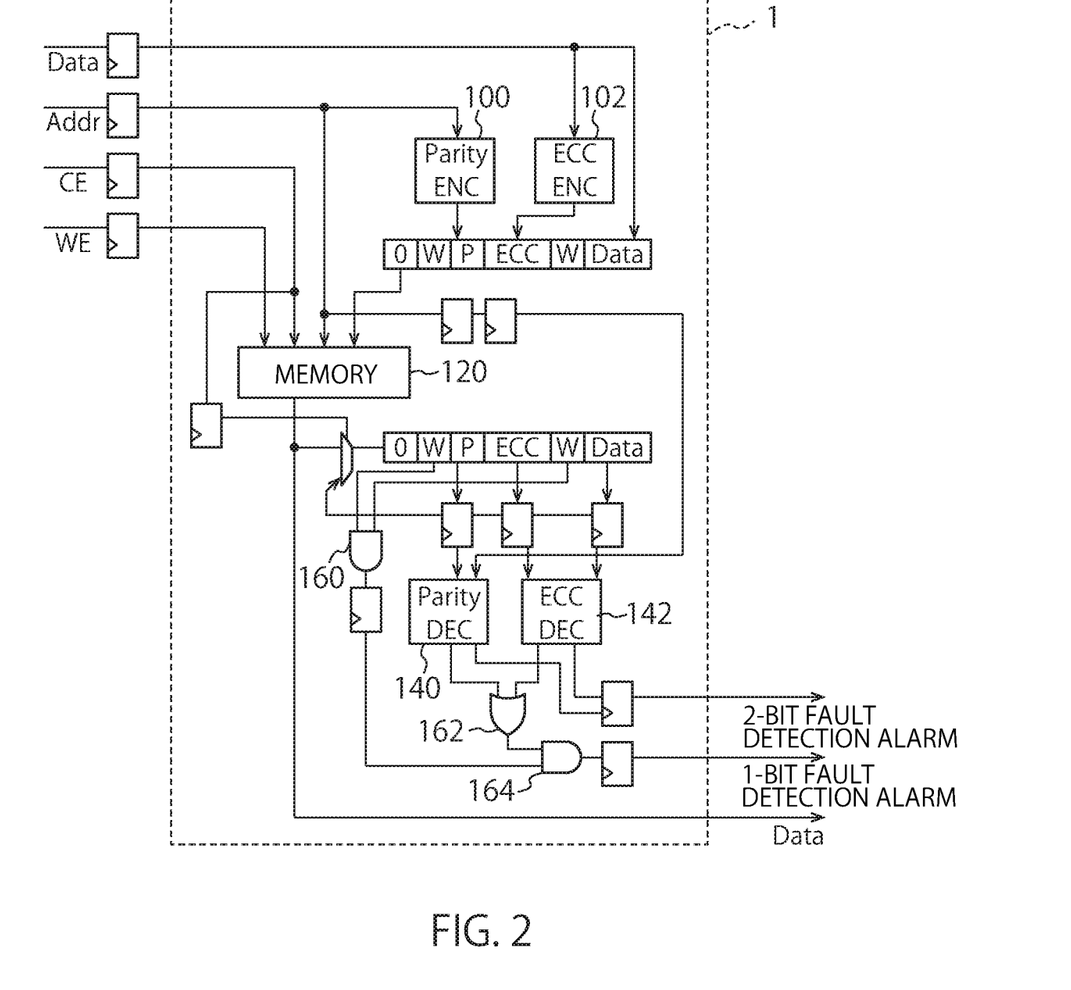
FIG. 2 is a diagram illustrating a mounting example of an information processing circuitry according to an embodiment.

FIG. 2 illustrates a mounting example of this embodiment. The information processing circuitry 1 in FIG. 2 includes a parity encoder 100, an ECC encoder 102, a memory 120, a parity decoder 140, and an ECC decoder 142. Each buffer circuitry (register circuitry) illustrated in the drawing is intended to adjust the timing of input/output of input data Data, for example, synchronization timing of reading/writing the data, and can be increased or decreased in number according to the situation. This also applies to buffers in the subsequent drawings.

Comparing with the components in FIG. 1, the parity encoder 100 and the ECC encoder 102 are provided in the storage data generation circuitry 10, the memory 120 is provided in the storage circuitry 12, the parity decoder 140 and the ECC decoder 142 are provided in the comparison data generation circuitry 14, and the other logical sum circuitries and so on are provided in the data comparison circuitry 16. As the input into the information processing circuitry 1, the input data Data, address data Addr, a chip enable signal CE, and a write enable signal WE are illustrated, but other information may be input if it is necessary, and each enable signal may be appropriately omitted if it is unnecessary.

In this mounting example, the input data Data is stored in the memory 120 in units of word. The parity encoder 100 is a circuitry which generates a parity bit. When the address data Addr is input, the parity encoder 100 outputs the parity of the address. The parity may be, for example, an even parity or an odd parity, and only needs to be the one which is uniquely converted from the address data Addr.

The ECC encoder 102 is a circuitry which generates an error correction code. The ECC encoder 102 outputs the ECC of the input data Data. The method of the ECC is not particularly limited but may be, for example, an arbitrary method such as a parity code intended to defect an error, or a hamming code, a convolutional code or the like intended to correct an error. For example, in the case of the parity code, the parity encoder 100 may be a first parity bit generation circuitry, and the ECC encoder 102 may be a second parity bit generation circuitry which generates the parity of the input data Data.

Figure 3:
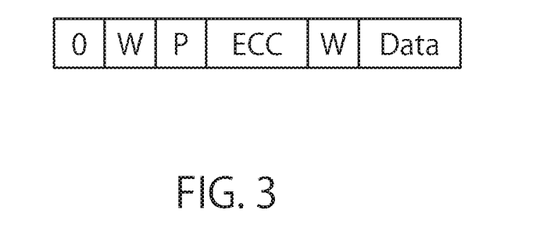
FIG. 3 is a chart illustrating an example of a storage data sequence according to an embodiment.

FIG. 3 is a chart illustrating an example of the data to be stored in the memory 120. Leading 0 indicates the start point of the data, and is not particularly important data in this embodiment. P indicates the parity bit. ECC indicates the error correction code. At the end of the data sequence, the input data Data is stored.

W indicates the write flag. Note that the write flags in FIG. 3 are 2 bits and provided one bit each before and after the redundancy bits of the parity and the ECC. The write flag has been initialized, for example, with 0, and 1 is set at the timing of writing. The storage data generation circuitry 10 may separately include a write flag setting circuitry.

The initialization of the write flag may be executed, for example, at the activation of the information processing circuitry 1 or may be executed at a predetermined or arbitrary timing. This initialization may be executed by initializing all of bits in the memory 120 to 0. As another example, the write flag in the memory 120 may be selectively initialized to 0. Further, the separately provided write flag setting circuitry may execute the initialization of the write flag, or a write flag initialization circuitry may be further provided.

Note that this sequence of the data is explained merely as one example, and is not limited to the one illustrated in FIG. 3 as long as the sequence is configured so that the above data is appropriately stored.

The memory 120 is a circuitry which stores the data stored in the storage circuitry 12. The parity decoder 140 compares a value of the parity bit P read from the memory 120 with the value of a parity calculated from the read data.

The ECC decoder 142 compares the error correction code ECC of the data read from the memory 120 with an error correction code calculated from the read data. The ECC decoder 142 executes the comparison by generating the data by the same method and process as those of the ECC encoder 102.

The parity decoder 140 and the ECC decoder 142 output 0 when the values compared by the decoders are equal, and output 1 when the values are different. Such circuitries may be mounted including an exclusive logical sum circuitry as an example. Note that the comparison data generation circuitry 14 may be a circuitry in which the decoders execute also a part of the comparison, namely, a circuitry in which the decoders execute also a part of the function of the data comparison circuitry 16.

A logical product circuitry 160 calculates a logical product of the write flags W from the redundancy bits. The calculated value becomes 1 when all of the write flags W are 1, and becomes 0 when any of the write flags W is 0. In other words, the logical product circuitry 160 outputs a value which enables determination whether the write flags W are normally set in the stored data.

A logical sum circuitry 162 calculates a logical sum of output values of the parity decoder 140 and the ECC decoder 142. The calculated value becomes 1 when an error is detected in the decoders, and becomes 0 when no error is detected.

A logical product circuitry 164 calculates a logical product of the outputs of the logical product circuitry 160 and the logical sum circuitry 162. More specifically, the logical product circuitry 164 outputs 1 in the case where the parity and the ECC have not been normally read/written in a state where the write flags W are normally set, and outputs 0 in the other cases. For example, in the case where the writing of data has an abnormality in a state where the writing itself is normally executed, or in the case where the bit value of the memory 120 is inverted due to the influence of cosmic rays or the like, the logical product circuitry 164 outputs 1. The output from the logical product circuitry 164 enables determination whether writing and reading have been normally executed. The information processing circuitry 1 outputs the output of the logical product circuitry 164 as a 1-bit fault detection alarm.

Note that the outputs of the parity decoder 140 and the ECC decoder 142 may be separately output as a 2-bit fault detection alarm from the information processing circuitry 1. In the case where an abnormality is recognized in the output of the logical product circuitry 164, it becomes possible to determine whether the abnormality exists in the address data or the abnormality exists in storage of the input data. As explained above, the information processing circuitry 1 output, for example, the 1-bit fault detection alarm and the 2-bit fault detection alarm together with the read data Data.

Second Mounting Example

Figure 4:
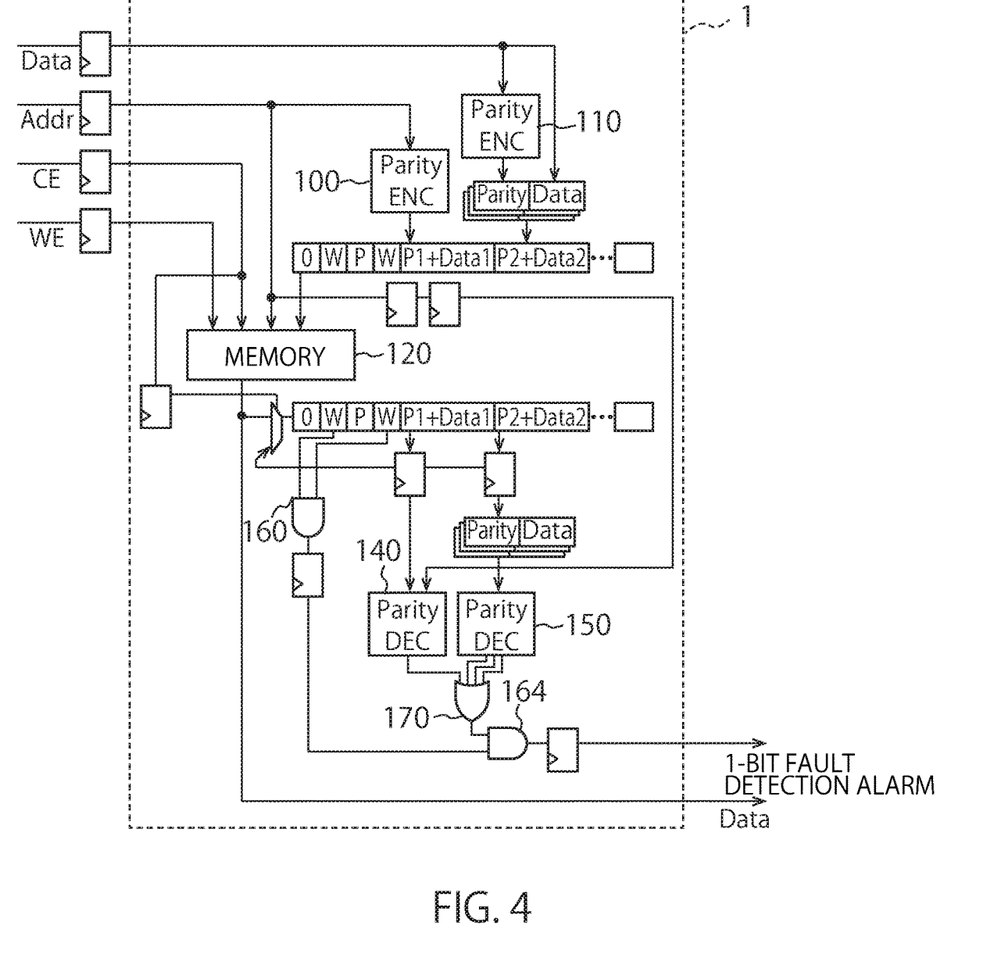
FIG. 4 is a diagram illustrating a mounting example of an information processing circuitry according to an embodiment.

FIG. 4 illustrates another mounting example of this embodiment. An information processing circuitry 1 in FIG. 4 includes parity encoders 100, 110, a memory 120, and parity decoders 140, 150.

In this mounting example, the input data Data is stored in the memory 120, for example, in units of byte. For example, the parity bit of the input data Data is calculated in units of byte, and the data in units of byte and the parity bit are collectively stored. Then, in the case of reading, the data is accessed in units of byte.

Therefore, a plurality of parity encoders 110 may be provided to process the data in units of byte. In this case, each of the plurality of parity encoders 110 generates in advance the parity bit of the input data Data divided into predetermined units of byte, and adds the parity bit to the data to generate storage data.

Figure 5:
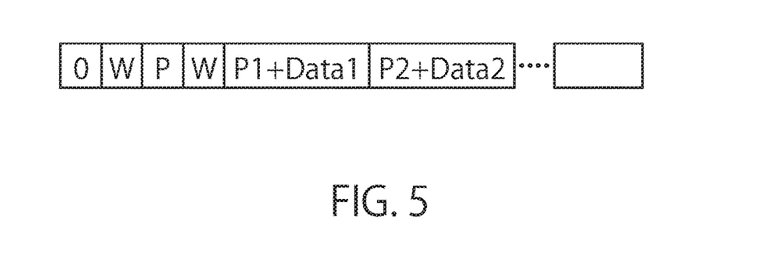
FIG. 5 is a chart illustrating an example of a storage data sequence according to an embodiment.

FIG. 5 is a chart illustrating an example of the storage data in this mounting example. As in the first mounting example, W indicates the write flag, and P indicates the parity bit of the address data.

Subsequently to the write flags W and the parity bit P, the input data Data is stored in units of byte. To each of the data in units of byte, the parity bit generated by the parity encoder 110 is added. For example, in the first byte, first data Data1 and a first parity bit P1 are added and stored. Similarly, the data in units of byte and parity bits are generated as sets of Data2 and P2, . . . , and stored in the memory 120.

A plurality of parity decoders 150 may be provided to process data in units of byte. Each of the plurality of parity decoders 150 generates a parity bit of the data in predetermined units of byte and compares the parity bit with the parity bit added to the data. The parity decoder 150 compares, for example, the parity bit generated from the first data Data1 with the first parity bit P1 stored in the memory 120, and outputs 0 when they coincide, and outputs 1 when they do not coincide.

A logical sum circuitry 170 calculates a logical sum of the outputs from the parity decoders 140, 150. More specifically, the logical sum circuitry 170 outputs 1 when the parities of the address data and the parities of the input data have a noncoincident portion, and outputs 0 when all of the parities coincide.

As explained above, also in the case of storing the input data Data in units of byte, the same effect can be provided.

Third Mounting Example

An error correcting circuitry may be further provided in the configurations of FIG. 2 and FIG. 4. In FIG. 2, the error correcting circuitry executes an error correction from the error correction code ECC of the ECC decoder 142 and from the redundancy bits of the memory 120.

In FIG. 4, for example, the parity encoder 110 may find a horizontal parity for each byte and may find a vertical parity for each 8 bytes in the second mounting example. The error correction circuitry executes the error correction of 1 bit based on the horizontal parity for each byte generated by the parity decoder 150 and on the vertical parity for each 8 bytes.

When the error correction circuitry is provided, the information processing circuitry 1 may output data after execution of the error correction together with output of error information.

Fourth Mounting Example

An error injection circuitry may be provided which inverts the redundancy bits generated at the encoding or some of the bits of the storage data. In the case where the bits are inverted and an error is injected, it can be tested whether the error can be normally detected.

For example, the reading side is notified of the information on the bits inverted by the error injection circuitry, and various decoders perform error detection on the data containing the inverted bits, thereby making it possible to determine whether the injected error can be normally detected. Thus, the provision of the error injection circuitry enables also execution of an error detection test.

In the embodiment according to each of the mounting examples, the information processing circuitry 1 is intended to perform error detection and the like at the writing and reading the data, but is not limited to this. For example, the information processing circuitry 1 may be mounted to execute the test at the factory shipment, at the maintenance, at the start, for every predetermined time or the like.

Figure 6:
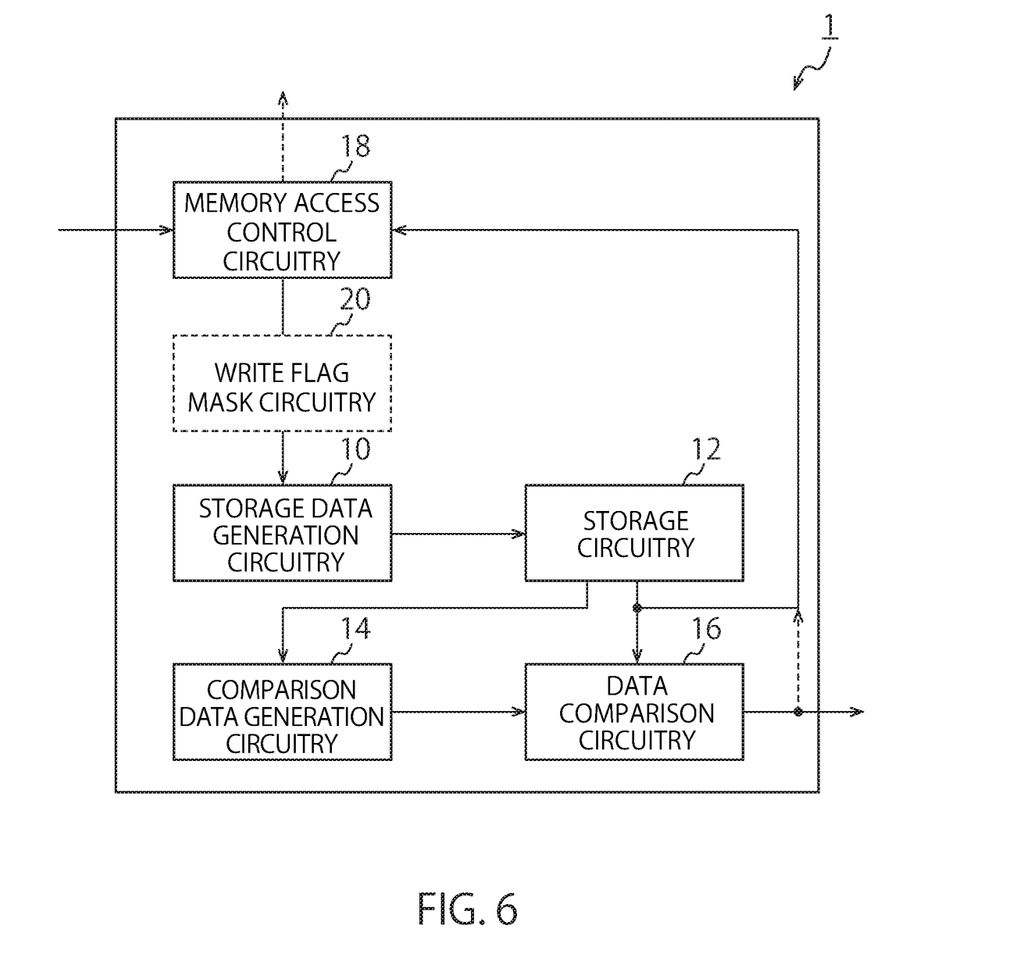
FIG. 6 is a block diagram illustrating functions of an information processing circuitry according to an embodiment.

FIG. 6 is a block diagram illustrating an example of an information processing circuitry 1 including a test function. The information processing circuitry 1 in FIG. 6 further includes a memory access control circuitry 18 in addition to the configuration in FIG. 1. The information processing circuitry 1 may further include a write flag mask circuitry 20.

The memory access control circuitry 18 includes, for example, a BIST (Built-In Self Test, including LBIST), and controls memory access regarding the data input from the external part into the information processing circuitry 1. The memory access control circuitry 18 may confirm that the data has been written into a designated address in the storage circuitry 12 and control the writing the data into the next address. Further, the memory access control circuitry 18 may receive a result of the comparison by the data comparison circuitry 16 and then control the writing of the data into the next address. Furthermore, the memory access control circuitry 18 may receive the value written in the storage circuitry 12 or the output from the data comparison circuitry 16 and confirm whether the input/output signal of the information processing circuitry 1 holds consistency.

The data comparison circuitry 16 may output, for example, the comparison result in units of word or units of byte every time, or may output a confirmation result after the test is ended in all or part of the storage area in the storage circuitry 12. When an error is detected, the data comparison circuitry 16 may output the address where the error has occurred together with the comparison result.

In this embodiment, the test data is input into the information processing circuitry 1. The information processing circuitry 1 alternately performs the writing and reading the test data into/out of the memory. It is confirmed whether both of the test data and the redundancy bits generated from the test data have been normally written. The test data may be the one generated by a random number or may be a magic number such as "0xAA", "0x55", "0xDEADBEEF" or the like. Alternatively, actual data acquired at the start in the past may be used.

The memory access control circuitry 18 controls the access of the storage circuitry 12 to the test data input into the information processing circuitry 1. The memory access control circuitry 18 may perform control on all the memory area in the storage circuitry 12 or a part of the memory area being a target. The memory access control circuitry 18 executes the test by controlling the writing and reading of the test data in units of word in order on all the memory area. The order may be an ascending order, a descending order, or a randomly decided order. Alternatively, the memory access control circuitry 18 may execute the test on the area which is a test target designated from the external part.

The memory access control circuitry 18 performs control on the next address referring to the address of the storage circuitry 12 or at the timing output from the data comparison circuitry 16. As explained above, the memory access control circuitry 18 executes the test whether the writing and reading are normally performed in all or a designated part of the storage area and whether the fault detection circuitry normally functions.

The information processing circuitry 1 may further include a write flag mask circuitry 20. The write flag mask circuitry 20 initializes the write flag, for example, to 0 in the storage area of the storage circuitry 12. The provision of the write flag mask circuitry 20 also enables, for example, determination that the writing is normally executed only in units of word.

The main function of the information processing circuitry 1 and the above-explained test function may be configured to be switchable by a fault diagnosis control signal input from the external part.

Fifth Mounting Example

Figure 7:
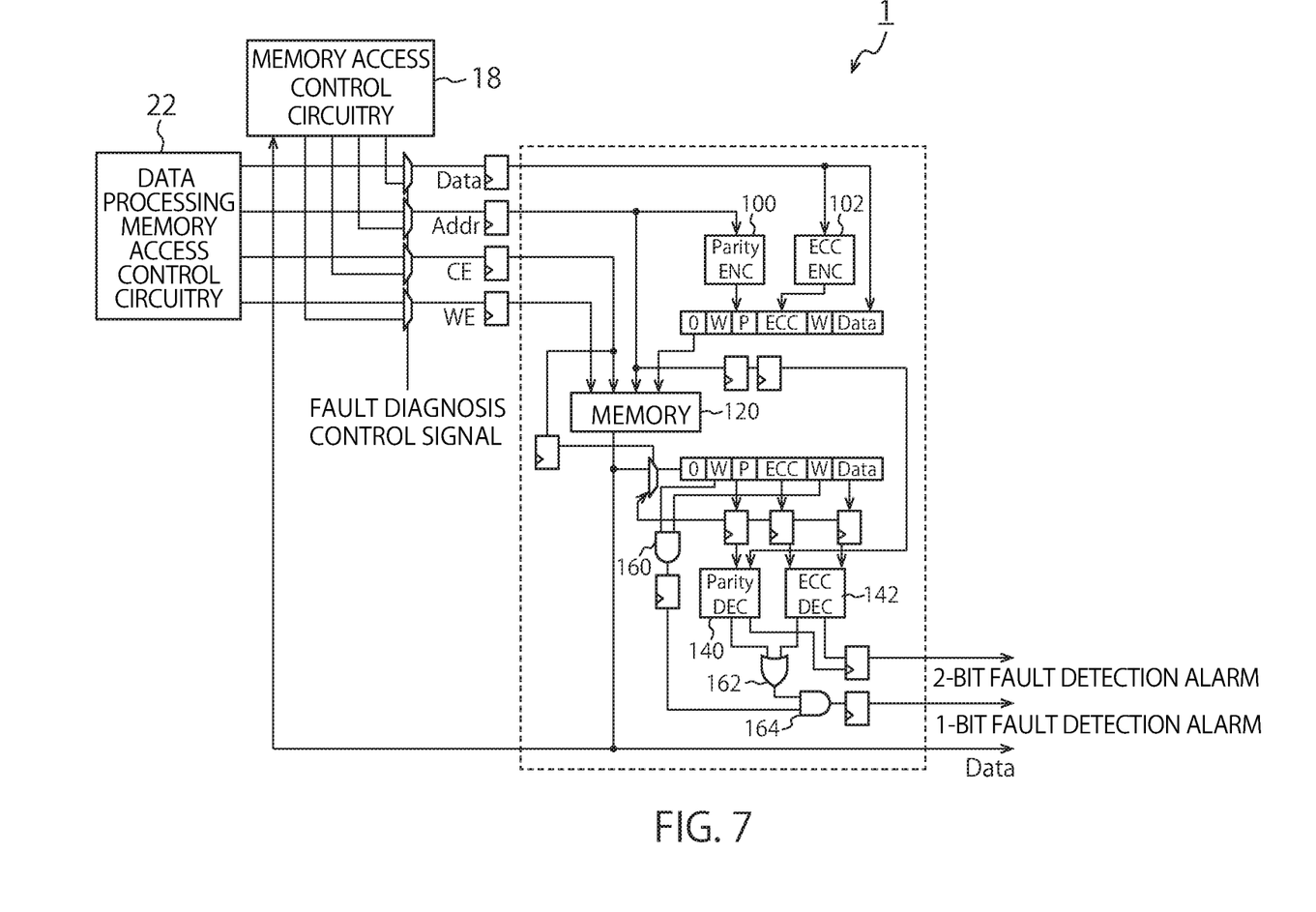
FIG. 7 is a diagram illustrating a mounting example of an information processing circuitry according to an embodiment.

FIG. 7 is a diagram illustrating a mounting example of a memory access control circuitry 18. The information processing circuitry 1 further includes a data processing memory access control circuitry 22. The data processing memory access control circuitry 22 is a circuitry which accepts the input into the information processing circuitry 1, and controls the input data Data, the address data Addr and the like. The memory access control circuitry 18 controls the access of the input to the memory and thereby can exhibit the aforementioned functions.

As explained above, according to all of the embodiments, even when the actual logic cannot be changed in the storage circuitry 12, more specifically, the circuitry of the memory 120, the fault detection function can be added without dividing the memory area into two parts. This can achieve the reduction in power consumption and mounting area, and reduction of the risk of causing a problem of the timing of logic synthesis in fault detection. Further, since a parity is separately generated from the address data, the fault of the data in the storage circuitry 12 and the fault of the address decoder can be independently determined. Further, also when the reading precedes the writing, and the reading and discarding of the data by the write flag, the memory can be used without initialization. Further, the provision of the memory access control circuitry 18 and so on makes it possible to redundantly perform the memory initialization determination.

In all of the above-explained embodiments, all or some of the functions may be mounted by analog circuitries or mounted by programmable logical circuitries such as FPGA (Field-Programmable Gate Array) or the like. Further, in at least some of the functions, information processing by software may be concretely realized by hardware resources.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing circuitry comprising:
   a storage data generation circuitry configured to add redundancy bits and a write flag indicating that writing has been made, to input data to generate storage data;
   a storage circuitry, connecting to the storage data generation circuitry, configured to store the storage data;
   a comparison data generation circuitry, connecting to the storage circuitry, configured to generate redundancy bits from data stored in the storage circuitry; and
   a data comparison circuitry, connecting to the storage circuitry and the comparison data generation circuitry, configured to compare the redundancy bits added by the storage data generation circuitry with the redundancy bits generated by the comparison data generation circuitry to execute error detection based on a comparison result and on the write flag.

2. The information processing circuitry according to claim 1, wherein
   the redundancy bits include a parity bit based on an address for storage in the storage circuitry, and a parity bit based on the input data or an error correction code.

3. The information processing circuitry according to claim 2, further comprising
   a first parity bit generation circuitry configured to generate a parity bit from data on the address.

4. The information processing circuitry according to claim 1, further comprising
   a data correction circuitry configured to execute error correction of the data stored in the storage circuitry based on the input data and on information on the redundancy bits added by the storage data generation circuitry.

5. The information processing circuitry according to claim 1, wherein
   the storage data generation circuitry generates a plurality of bits of the write flag by copying the write flag.

6. The information processing circuitry according to claim 5, wherein
   the storage data generation circuitry generates the plurality of bits of the write flag provided as bits existing at positions away from each other.

7. The information processing circuitry according to claim 1, further comprising
   an error injection circuitry configured to invert at least any 1 bit of a data sequence generated by the storage data generation circuitry.

8. The information processing circuitry according to claim 1, wherein:
the storage data generation circuitry generates the redundancy bits for the input data in units of word; and
the storage circuitry writes or reads the input data in units of word.

9. The information processing circuitry according to claim 1, wherein:
the storage data generation circuitry generates the redundancy bits for the input data in units of byte; and
the storage circuitry writes or reads the input data in units of byte.

10. The information processing circuitry according to claim 1, further comprising
a memory access control circuitry configured to control memory access from an external part, wherein when test data is input:
the storage data generation circuitry generates the storage data for the test data;
the comparison data generation circuitry generates the redundancy bits from the data stored in the storage circuitry;
the data comparison circuitry compares the redundancy bits generated by the storage data generation circuitry and by the comparison data generation circuitry to execute the error detection based on the comparison result and on the write flag, and tests whether writing and reading of the data is normally executed, based on a result of the error detection.

11. The information processing circuitry according to claim 10, wherein
the test data is a random number or a fixed number.

12. The information processing circuitry according to claim 1, further comprising
a memory access control circuitry configured to control memory access from an external part, wherein when test data is input,
the memory access control circuitry writes the test data in all or part of an area where writing is possible in the storage circuitry.

13. The information processing circuitry according to claim 10, further comprising
a write flag mask circuitry configured to initialize a bit corresponding to the write flag in the storage circuitry.

14. The information processing circuitry according to claim 12, further comprising
a write flag mask circuitry configured to initialize a bit corresponding to the write flag in the storage circuitry.

15. The information processing circuitry according to claim 1, configured not to execute error detection nor error correction, and not to output the comparison result nor the write flag, when the write flag is an initial value and the redundancy bits generated by the comparison data generation circuitry are different from the redundancy bits read from the storage circuitry.

16. The information processing circuitry according to claim 5, configured to determine that the error has occurred and output error information if the write flags are different each other when the redundancy bits read from the storage circuitry.

17. An information processing method comprising:
an information processing circuitry adding redundancy bits and a write flag indicating that writing has been made, to input data to generate storage data;
an information processing circuitry storing the storage data;
an information processing circuitry generating redundancy bits from stored data;
an information processing circuitry comparing the redundancy bits of the storage data with the generated redundancy bits; and
an information processing circuitry executing error detection based on a comparison result and on the write flag.

18. A non-transitory computer readable medium storing a program executing a method when executed by a computer, the method comprising:
adding redundancy bits and a write flag indicating that writing has been made, to input data to generate storage data;
storing the storage data;
generating redundancy bits from stored data;
comparing the redundancy bits of the storage data with the generated redundancy bits; and
executing error detection based on a comparison result and on the write flag.

* * * * *